United States Patent
Hevia et al.

(10) Patent No.: US 7,449,999 B2
(45) Date of Patent: Nov. 11, 2008

(54) SECURITY SYSTEM INTERFACE MODULE

(75) Inventors: Jorge Hevia, Lynbrook, NY (US);
Michael Carrieri, Melville, NY (US);
Thomas Karl, Lindenhurst, NY (US);
Jose Colucciello, Melbourne Beach, FL (US)

(73) Assignee: NAPCO Security Systems, Inc., Amityville, NY (US)

( * ) Notice: Subject to any disclaimer, the term of this patent is extended or adjusted under 35 U.S.C. 154(b) by 299 days.

(21) Appl. No.: 11/505,721

(22) Filed: Aug. 17, 2006

(65) Prior Publication Data

US 2008/0042826 A1 Feb. 21, 2008

(51) Int. Cl.
*G08B 1/00* (2006.01)
(52) U.S. Cl. .................. 340/531; 340/533; 340/541; 348/152; 725/108
(58) Field of Classification Search ............ 340/531, 340/533, 541, 539.1, 506, 552, 566, 567; 348/152–155, 159; 725/108; 709/217–219, 709/232; 379/33, 37, 39, 40, 42, 44, 45, 379/51
See application file for complete search history.

(56) References Cited

U.S. PATENT DOCUMENTS 6,930,598 B2 * 8/2005 Weiss ..................... 340/531
7,015,806 B2 * 3/2006 Naidoo et al. ............ 340/531
7,349,682 B1 * 3/2008 Bennett et al. ........... 340/545.1
2003/0056012 A1 * 3/2003 Modeste et al. .......... 709/249
2003/0101459 A1 * 5/2003 Edson .................... 725/82
2004/0253926 A1 12/2004 Gross
2007/0290830 A1 * 12/2007 Gurley ................... 340/506

OTHER PUBLICATIONS

Napco Security Systems, Inc., Napco Internet Video VIP-Gateway Universal 4-Camera IP Module specification sheet, 2004, USA.

* cited by examiner

*Primary Examiner*—Thomas J Mullen
(74) *Attorney, Agent, or Firm*—John R. Mugno (57) ABSTRACT

An alarm interface module is described that permits an alarm monitoring system to be operational through an existing wide area network (WAN) modem that is linked to an existing local area network (LAN) system wherein the alarm interface module has a first LAN port coupled to the LAN system, a second LAN port coupled to an output port of an alarm control panel of the alarm monitoring system, a WAN port coupled to the WAN modem, and a programming element capable of recognizing an identifying address dynamically assigned to the alarm control panels to route data from a remote alarm server to the alarm control panel while also permitting data communications to the LAN system from the WAN modem that are not initiated from the remote alarm server. The security system interface module of the present invention can be used with any security alarm panels, sensors, video devices, etc.

36 Claims, 5 Drawing Sheets

SECURITY SYSTEM INTERFACE MODULE

FIELD OF THE INVENTION

This invention is generally directed to a "plug-and-play" or, more accurately, a "plug-and-leave" security interface module for connecting a security alarm system to an existing computer system that utilizes a broadband modem. Specifically, the security interface module of the present invention can be installed without the need for modifying the software configuration of the computer and without the need for incorporating any additional hardware or firmware into the computer. Thus, the security interface module of the present invention permits a security installer to connect any type of security monitoring system comprising various types of alarm sensors, or a video monitoring system comprising various types of video monitoring cameras to an existing internet-based computer without the need for any specialized training in Transmission Control Protocol/Internet Protocol (TCIP/IP) technology or networking expertise. Moreover, in video applications, no customized cameras are required.

BACKGROUND OF THE INVENTION

Although still a somewhat new industry, the security industry has undergone significant improvements over the years by adapting security alarm panels, alarm sensors, communication devices and other security components to conform with, and be compatible with, advancing technologies from other fields. Changing technologies have required modifications and improvements to security devices to maintain their viability in the marketplace. Regrettably, the burgeoning level of technology utilized in present security alarm systems has far outpaced the level of skill of most installers of such security alarm systems.

The earliest forms of security alarm systems consisted primarily of a "closed loop" wiring system. If the closed loop was violated by means of a door opening, a window being opened (or broken), etc., a buzzer at the location would sound. Of course, if the protected premises were in an isolated (or, conversely, an extremely noisy) environment, the triggered alarm sound would do little to prevent burglaries. Additionally, in the earliest closed loop security alarm systems, false alarms were so prevalent, that even if an audible or visual indicator was activated based on an unauthorized intrusion, the visual and/or audible indicator was often ignored.

With the advent of telephony, security alarm systems were modified to allow the alarm system to capture a telephone line and utilize a digital dialer to contact a remotely located central alarm monitoring station or a local police department. Personnel at the central alarm monitoring station or local police department would then visit the violated premises or, more often, contact the owner of the protected premises, via telephone, to determine if the transmitted alarm signal was caused by an inadvertent false alarm. Burglars could bypass such systems by disconnecting the telephone lines before entering the protected premises. Alarm manufacturers eventually overcame this deficiency by creating systems that would also trigger a tamper alarm if the system was compromised by the disconnecting of the telephone. In later systems, when two-way communications between the remote location and the security alarm panel were possible, the remote location could also be made to "ping " security alarm systems to determine if the security alarm system was operational. This two-way communication provided a much greater level of control and features in connection with security alarm systems, and also greatly reduced the number of visits to the protected premises, thus increasing the profitability of the alarm monitoring companies. The two-way communications allowed the central station to reset alarm systems, bypass zones, check battery conditions, etc.

Just as the advent of telephony allowed for numerous advances and potential applications in the security industry, the proliferation of internet modems, personal computers, wireless handheld internet-based devices, and the like are creating a new revolution of advancements within the security industry. Various alarm signals and video images can now be sent immediately over a broadband modem to any desired central alarm monitoring station, cell phone, police department, etc.

Certain systems exist in the prior art that permit the remote monitoring of video cameras via the internet. However, all such existing systems require customized cameras, specialized software, additional network cards, and the like, to permit proper functioning. The difficulty in achieving widespread acceptance of such internet-based security systems is due to both the lack of computer-based experience of installers to incorporate such technology and the reluctance on the part of customers to have installers modify their computer or computer network. Many people maintain sensitive information on their computer—they simply do not want it tampered with by an unknown installer.

As will be readily recognized by anyone who has attempted to repair a computer or computer network, or by anyone who has simply attempted to incorporate a new device or software package onto their computer or computer network, computer "glitches" are extremely time-consuming to identify and repair. Since the actual salaries of the installers are perhaps the highest cost item of installing a security alarm system, alarm companies are reluctant to adopt any security system that requires the installer to access the internal workings and configuration of a customer's computer. Moreover, the expertise required of the installer becomes even greater based on the various types of modems, voice connections, operating systems, etc. For instance, many of the aforementioned prior art alarm systems that utilize a telephone system cannot be incorporated over new voice-over-internet protocol (VoIP) technology, at least, without once again accessing a home-owner's computer. Moreover, a further level of complexity is involved depending upon whether an existing internet modem is connected to a router or to a single computer. Additionally, numerous types of broadband modems including DSL lines and cable modems can be implemented. As the term is commonly used in the field, and for purposes of this application (including the appended claims), the term "modem" will also include direct high speed internet connections, such as T1 lines and the like. In short, security alarm installers do not have the necessary expertise to adopt security alarm systems to all such environments. It also would be economically unfeasible for security alarm companies to hire personnel with such expertise.

It is therefore a primary object of the present invention to provide a new and improved interface system and method for connecting a security monitoring system to an existing internet modem.

It is yet another object of the present invention to provide a new and improved interface system and method for connecting a security monitoring system to an internet modem that requires no reconfiguration of an existing computer system.

It is still a further object of the present invention to provide a new and improved interface system and method for connecting a security monitoring system to an internet modem that is applicable to both individual computers and computer networks connected through a router.

It is an additional object of the present invention to provide a new and improved interface module system and method for connecting a security monitoring system to an internet modem which can be connected to a video module.

It is still an additional object of the present invention to provide a new and improved interface system and method for connecting a security monitoring system to an internet modem that is adapted to transmit signals to and from an alarm panel that receives signals from any type of alarm sensor.

Other objects and advantages of the present invention will become apparent from the specification and the drawings.

SUMMARY OF THE INVENTION

Briefly stated and in accordance with the preferred embodiment of the present invention, an alarm interface module is described that permits an alarm monitoring system to be operational through an existing wide area network (WAN) modem that is linked to an existing local area network (LAN) system wherein the alarm interface module has a first LAN port coupled to the LAN system, a second LAN port coupled to an output port of an alarm control panel of the alarm monitoring system, a WAN port coupled to the WAN modem, and programming means capable of recognizing an identifying address dynamically assigned to the alarm control panels to route data from a remote alarm server to the alarm control panel while also permitting data communications to said LAN system from said WAN modem that are not initiated from the remote alarm server. The security system interface module of the present invention can be used with any security alarm panels, sensors, video devices, etc.

BRIEF DESCRIPTION OF THE DRAWINGS

While the specification concludes with claims particularly pointing out and distinctly claiming the subject matter regarded as the invention herein, it is believed that the present invention will be more readily understood upon consideration of the description, taken in conjunction with the accompanying drawings, wherein:

DESCRIPTION OF THE PREFERRED EMBODIMENT

Figure 1:
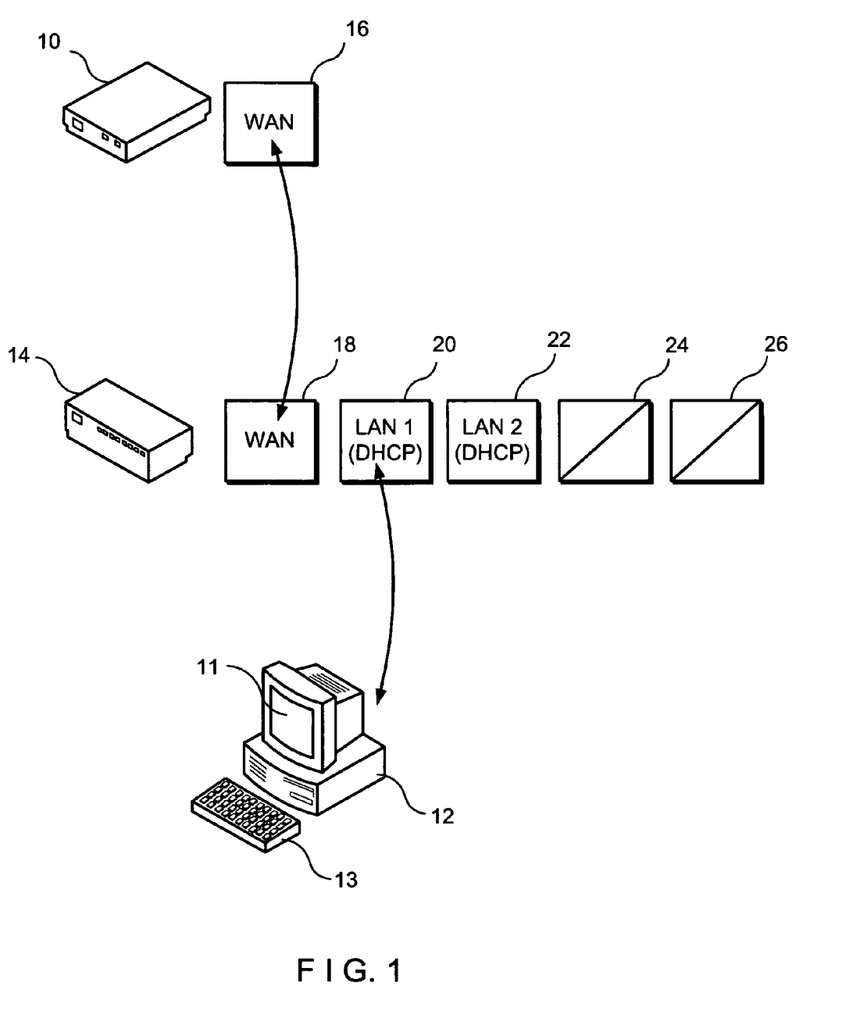
FIG. 1 is a schematic illustration of the implementation of a security interface module of the present invention operational through an existing WAN modem linked to an existing LAN system wherein only a single computer is depicted and no router is utilized.

Referring first to FIG. 1, a modem 10, a personal computer 12, and a security interface module 14 are shown. Modem 10 has a WAN port 16 connected to a WAN port 18 of security interface module 14. Personal computer 12 is connected to a LAN port 20 of security interface module 14.

It should be noted by those skilled in the art that modem 10 can be comprised of any broadband modem such as a cable modem, a DSL line, etc. Moreover, as described in this specification, personal computer 12 can be any type of processing means including a MACINTOSH computer, a UNIX device, etc. While personal computer 12 has been shown to have a monitor 11 and a keyboard 13, such features are not necessarily required or can take different shapes. Typically, personal computer 12 is defined as being part of the LAN system and modem 10 is defined as being part of the WAN system.

LAN port 20 and a supplemental LAN port 22 (which is illustrated in FIG. 1 as not being connected to any other device) typically utilize Dynamic Host Configuration Protocol (DHCP). DHCP protocol is a protocol for assigning dynamic internet protocol (IP) addresses to devices on a network. With dynamic addressing, a device can have a different IP address every time it connects to the network for security purposes. DHCP can also support a mix of static and dynamic IP addresses. The utilization of dynamic addressing greatly reduces the possibility of hackers accessing personal computer 12 or tampering with any devices connected to the network. Obviously, this level of protection is of particular importance in home security applications. Numerous protocols and security measures are well known in the art; however, a full understanding of such protocols and the like are not required for installers utilizing the system and method of the present invention. In fact, one of the advantages of the present invention is to permit an installer or user to configure and operate a security alarm system without such computer or networking knowledge. However, once again such knowledge can readily be obtained from known sources.

Referring again to FIG. 1, the description, to this point, describes security interface module 14 as acting no differently than a standard computer router (albeit with only one connected computer). However, security interface module 14 further comprises a LAN port 24 and a LAN port 26. In one embodiment of the present invention, LAN port 24 and LAN port 26 can be pre-programmed as "port-forward" ports that are specifically designed to receive and transmit data to and from compatible security devices (as will be described below). Alternatively, LAN ports 20, 22, 24, and 26 can be auto-sensing to determine if they are connected to a personal computer or router, or conversely, they are connected to compatible security devices. In short, security interface module 14 must be able to seamlessly route security-related data to the security devices and all other data to personal computer 12 (the LAN system).

Figure 2:
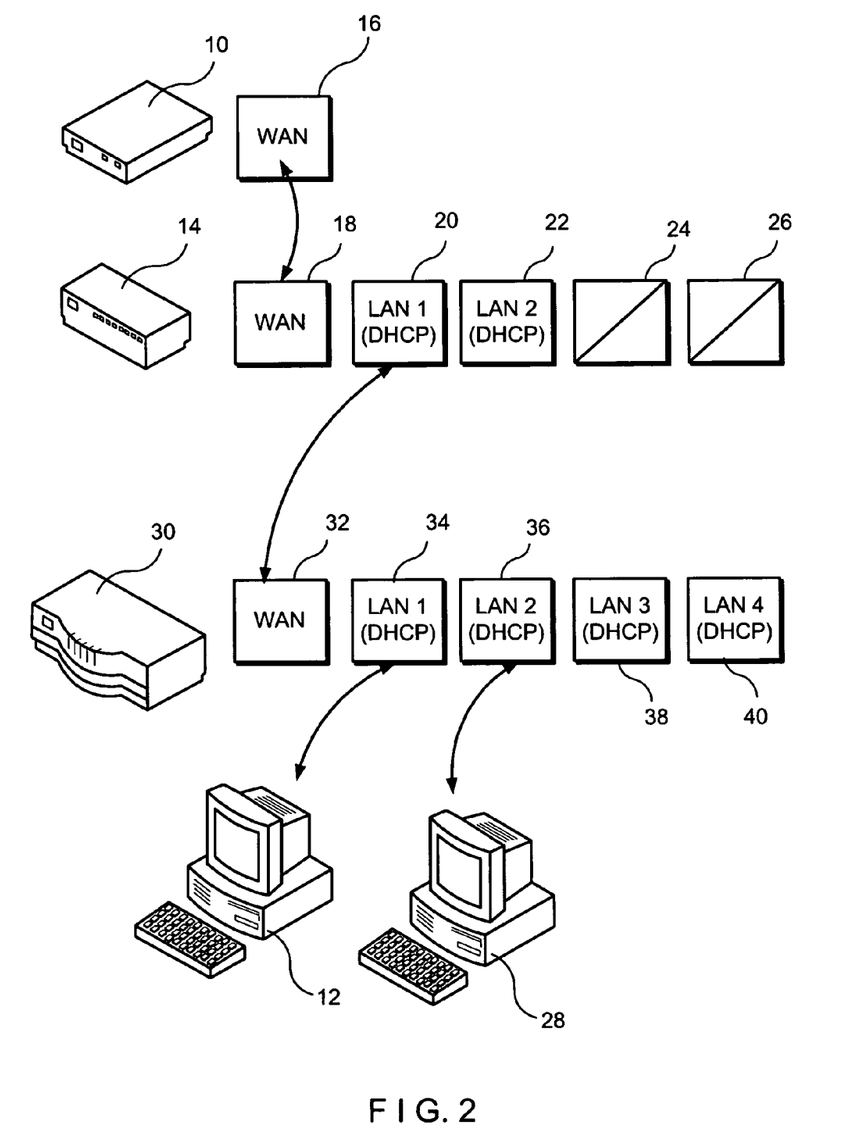
FIG. 2 is a schematic illustration of the implementation of the security interface module of the present invention operational through an existing WAN modem linked to an existing LAN system wherein two computers are depicted and a network router is utilized.

The term wide area network as utilized herein and in the appended claims, means either a single LAN personal computer connected to a WAN modem or multiple networked LAN personal computers connected to a WAN modem wherein information is distributed through a router. FIG. 2 is illustrative of a system similar to FIG. 1, but wherein a second personal computer 28 is also depicted. Personal computers 12 and 28 have data flow controlled by means of a router 30. In FIG. 2, like in FIG. 1, WAN port 16 of modem 10 is connected to WAN port 18 of security interface module 14. However, instead of LAN port 20 being connected directly to personal computer 12, LAN port 20 is connected to a WAN port 32 of router 30. Router 30 has a first LAN port 34 connected to personal computer 12 and a second LAN port 36 coupled to personal computer 28. Although not depicted as being attached to any further devices, router 30 also is shown as having additional LAN ports 38 and 40.

Figure 3:
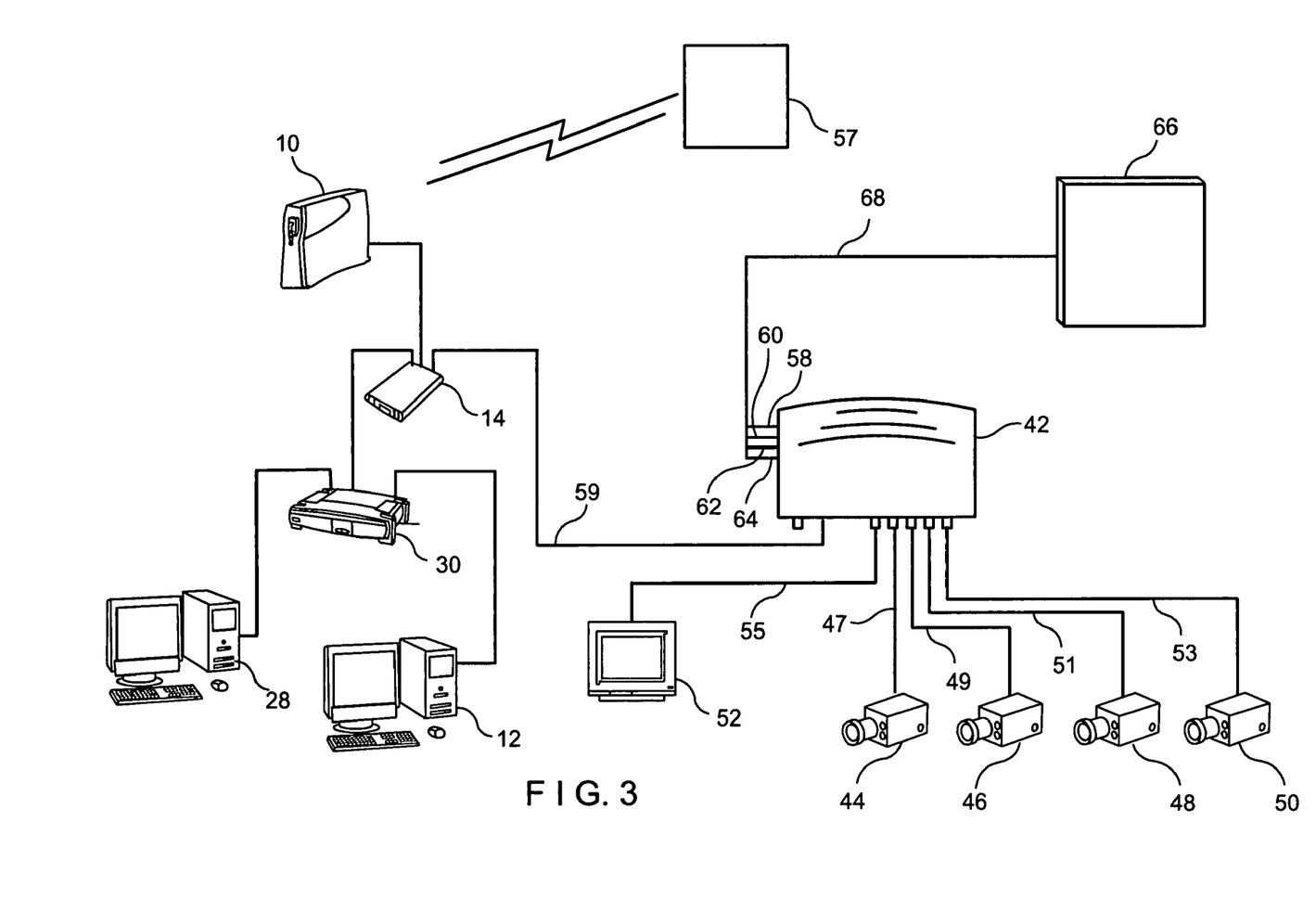
FIG. 3 is a schematic illustration of the implementation of a security interface module of the present invention operational through an existing WAN modem linked to an existing LAN system wherein the resultant monitoring system utilizes video monitoring devices and a video interface module.

Router 30 can be of any form known in the art. For instance, router 30 can be wired or it can be wireless. Moreover, a series of routers can be interconnected to create larger networks of personal computers. FIG. 3 again shows the interconnections between modem 10, security interface module 14, router 30, and personal computers 12 and 28. However, in FIG. 3, the system is connected to a video monitoring system. A video module 42 is shown connected to a plurality of video monitoring devices 44, 46, 48 and 50. Video monitoring devices 44, 46, 48, and 50 can be analog cameras, digital video recorders (DVRs), digital cameras, or any other type of video device. Video monitoring devices 44, 46, 48, and 50 can be connected to video module 42 by means of hardwiring along lines 47, 49, 51, and 53, respectively, or, alternatively, be connected wirelessly. Video module 42, as utilized when creating the preferred embodiment of the invention, is a model sold by the assignee of the present invention, Napco Security Systems, Inc., under the brand name VIP-GATE-WAY™. Other video modules are known and available in the art. Video module 42 can convert any four analog CCTV cameras into internet ready IP cameras by converting the analog signals into TCP/IP compatible signals that can be transmitted on the internet. Video module 42 can provide high resolution images to a local monitor 52 along line 55, or, via the internet, to a remote server 57 by means of a line 59. The assignee of the present invention utilizes a remote video server that it has branded VIDEO-ALERT.net™. Video module 42 can also be equipped with four input triggers 58, 60, 62, and 64 that are connected to a security alarm panel 66 by means of a trigger output line 68, so that, when activated, the transmission of video clips, over line 59, to remote server 57 will be made. Preferably, video module 42 will also permit local video output line 55 to lock in any desired one of video monitoring devices 44, 46, 48, and 50. Thus, the signal sent from alarm control panel 66, along its trigger output line 68 into trigger inputs 58, 60, 62, and 64 of video module 42 can be utilized to either trigger video monitoring devices 44, 46, 48 and 50 to transmit video clips to remote server 57, via line 59, or to latch the video signal of one of video monitoring devices 44, 46, 48 and 50 along a local output line 55 to local monitor 52. Video Module 42 also preferably includes memory for maintaining certain stored video images.

Figure 4:
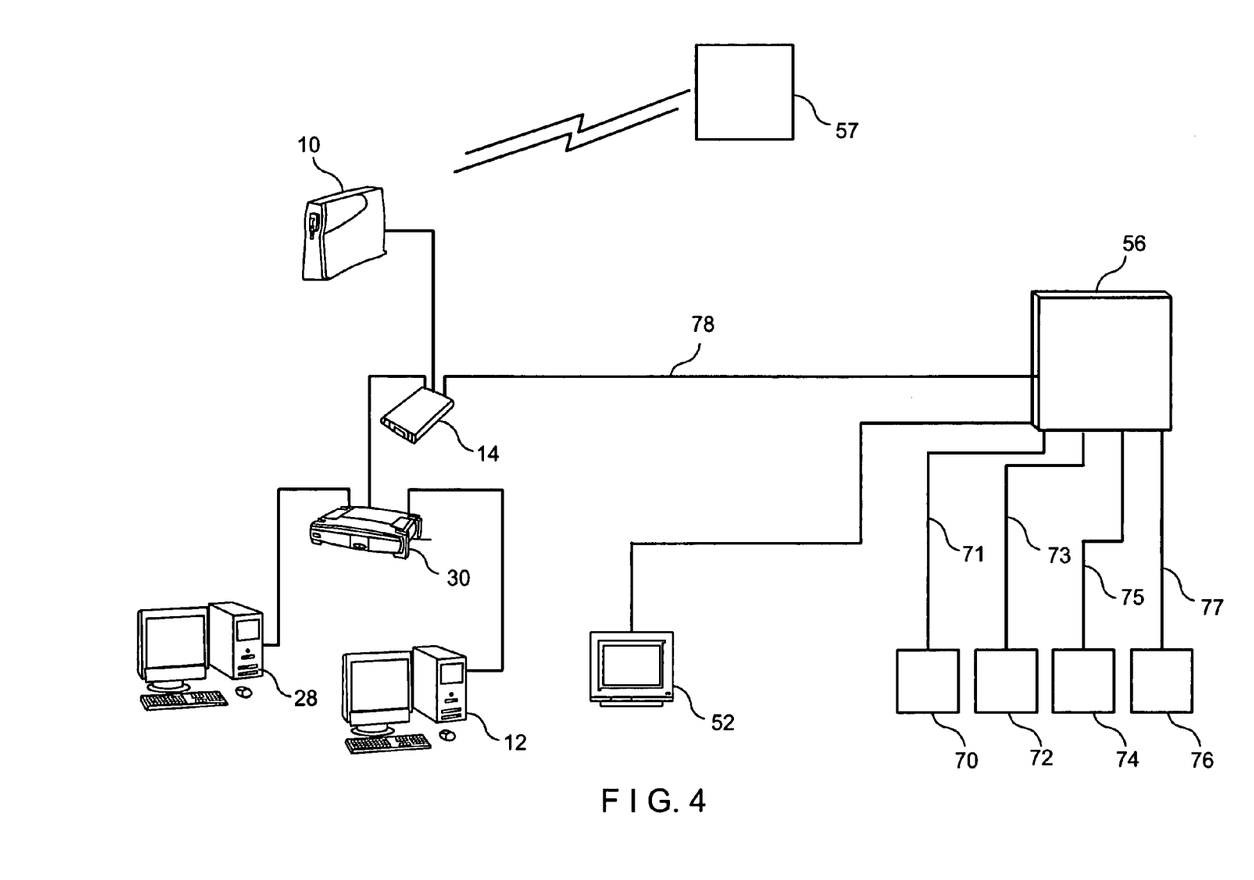
FIG. 4 is a schematic illustration of the implementation of the security interface module of the present invention operational through an existing WAN modem linked to an existing LAN system wherein the resultant monitoring system utilizes security alarm sensors connected through an alarm control panel.

Referring next to FIG. 4, the utilization of security interface module 14 in conjunction with a standard alarm system is shown. There is no need for video module 42 since alarm control panel 56 is directly connected to sensors 70, 72, 74 and 76 by either lines 71, 73, 75 and 77, respectively, or wirelessly. Sensors 70, 72, 74 and 76 can be any type of sensor used in the security industry including, but not limited to, passive infrared sensors, microwave sensors, glass break detectors, etc. Information from alarm control panel 56 forwarded to security interface module 14 over line 78 can be transmitted over the internet via modem 10 to remote server 57. Conversely, as will be described in greater detail with respect to FIG. 5, information from a remote server can be transmitted to modem 10, and filtered through security interface module 14 to be directed to security alarm control panel 56. Of course, information through modem 10 intended for computer 12 and/or computer 28 cannot and should not be misdirected to alarm control panel 56.

Figure 5:
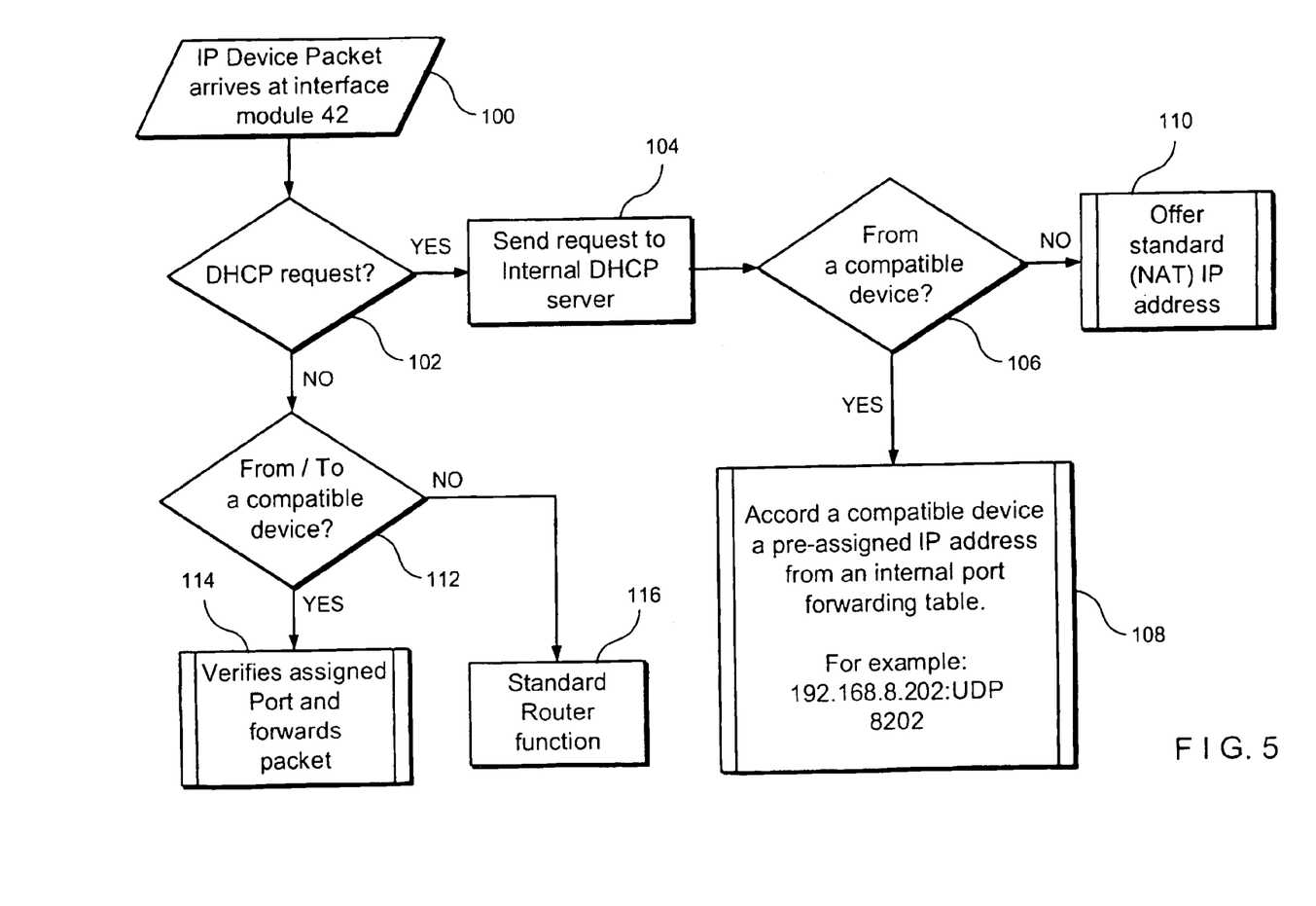
FIG. 5 is a flow chart representative of the operation of the security interface module utilized in conjunction with the present invention.

Whether a router is incorporated or not, whether a video module is used or not in conjunction with a security alarm control panel, and regardless of the number of computers attached to a network, it is evident that what is essential is that security interface module 14 determine if data should be directed to the alarm monitoring system as opposed to data that should be directed to the personal computers. FIG. 5 describes how security interface module 14 accomplishes this vital task. Although many permutations are possible, security interface module 14 is factory programmed to serve IP addresses that it identifies to be security-related in the range of 192.168.8.201, 192.168.8.202, 192.168.8.203, etc. This is best described in FIG. 5.

At a box 100, an IP device packet arrives at security interface module 14. The first determination, as reflected by a decision box 102, is whether the data packet constitutes a DHCP request. If it does, the request is sent to the internal DHCP server (box 104). As reflected by a decision box 106, the internal DHCP server will determine whether the request is from a compatible security monitoring device. If indeed it is, the compatible device will be accorded a pre-assigned IP address from an internal port forwarding table. In the utilized and exemplary protocol of the preferred embodiment, the IP address of 192.168.8.201 will use port 8201; similarly, IP address 192.168.8.202 will be assigned to port 8202. This protocol is described in a box 108. Conversely, if decision box 106 determines that the port is not connected to a security monitoring device, a standard IP address will be accorded to that port (box 110).

Generally, after all ports have been assigned appropriate addresses, new data will arrive at security interface module 14 (box 100) that does not reflect a DCHP request. If, at decision box 102, it is determined that the data is not reflective of a DHCP request, the data will pass to decision box 112. At this point, if the data packet is intended for the security alarm system, the packet will be forwarded to the appropriate security port (box 114). Conversely, if at decision box 112 it is determined that the packet is not intended for the security alarm system, the data will simply be routed to the appropriate personal computer, router or other device. The determination at decision box 112 is made by programming means within security interface module 14. The programming means can be software, firmware or other readily available programming devices. At times, such information will first pass through router 30, at other times (when no router is used), the data will pass directly to personal computer 12.

By dynamically assigning compatible security devices internet addresses within a predetermined range, the protocol of security interface module 14 can effectively direct security-related data from the security alarm panel (or other security device) to and from the internet without affecting computer users of the computer system in any way. Significantly, the aforementioned system and method requires no modifications to a personal computer or router.

It will be apparent from the foregoing description that the present invention utilizes a novel security interface module that permits security alarm signals to be passed over the internet, through existing networks, without any modification to a user's personal computer or router. Many variations of the preferred embodiment are clearly envisioned. For instance, the local server (or monitor) can have personnel that constantly monitor a protected premises. Moreover, still images or alarm signals can be forwarded to a mobile phone, personal organizers, or any other devices with internet capability. Additionally, although only a single video module and a single security panel have been depicted, the interface module of the present invention can be connected and route data to numerous recognized and compatible devices.

While there has been shown and described what is presently considered to be the preferred embodiments of this invention, it will be obvious to those skilled in the art that various changes and modifications may be made without departing from the broader aspects of this invention. It is, therefore, aimed in the appended claims to cover all such changes and modifications as fall within the true scope and spirit of the invention.

We claim:

1. A video monitoring system operational through an existing wide area network (WAN) modem linked to an existing local area network (LAN) system comprising:
   a remote video server;
   a first video monitoring device;
   a video module having a first input port coupled to said first video monitoring device and an output port for transmitting a video output signal, wherein said video module is dynamically assigned an identifying address within a predetermined range; and
   a video interface module having a first LAN port coupled to said LAN system, a second LAN port coupled to said output port of said video module, a WAN port coupled to said WAN modem, and programming means capable of recognizing said identifying address dynamically assigned to said video module to route data from said remote video server to said video module while also permitting data communications to said LAN system from said WAN modem that are not initiated from said remote video server.

2. The video monitoring system of claim 1 further comprising a second video monitoring device coupled to a second input port on said video module.

3. The video monitoring system of claim 2 wherein said first video monitoring device and said second video monitoring device are analog cameras.

4. The video monitoring system of claim 3 wherein said video module includes an analog-to-digital converter to convert an analog video signal received at said first and second input ports of said video module into said video output signal that is in digital format.

5. The video monitoring system of claim 1 wherein said first video monitoring device is a digital video recorder.

6. The video monitoring system of claim 1 wherein said video module includes memory for storing a video clip from said first video monitoring device.

7. The video monitoring system of claim 6 wherein said video module further includes a trigger input/output port to transmit said stored video clip to said remote video server.

8. The video monitoring system of claim 1 wherein said video module further includes a trigger input/output port to enable video from said first video monitoring device to be forwarded to said remote video server.

9. The video monitoring system of claim 1 wherein said LAN system includes a personal computer.

10. The video monitoring system of claim 1 wherein said modem is a cable modem.

11. The video monitoring system of claim 1 wherein said modem is a DSL broadband modem.

12. A video monitoring system operational through an existing internet-linked computer network wherein said network comprises (i) a modem having a WAN port, (ii) a router having a WAN port and a LAN port, and (iii) a personal computer coupled to said LAN port of said router, said video monitoring system comprising:
   a remote video server;
   a first video monitoring device;
   a video module having a first input port coupled to said first video monitoring device and an output port for transmitting a video output signal, wherein said video module is dynamically assigned an identifying address within a predetermined range; and
   a video interface module having a first LAN port coupled to said WAN port of said router, a second LAN port coupled to said output port of said video module, a WAN port coupled to said WAN port of said modem, and programming means capable of recognizing said identifying address dynamically assigned to said video module to route data from said remote video server to said video module while also permitting data communications to said personal computer from said modem that are not initiated from said remote video server.

13. The video monitoring system of claim 12 further comprising a second video monitoring device coupled to a second input port on said video module.

14. The video monitoring system of claim 13 wherein said first video monitoring device and said second video monitoring device are analog cameras.

15. The video monitoring system of claim 14 wherein said video module includes an analog-to-digital converter to convert an analog video signal received at said first and second input ports of said video module into said video output signal that is in digital format.

16. The video monitoring system of claim 12 wherein said first video monitoring device is a digital video recorder.

17. The video monitoring system of claim 12 wherein said video module includes memory for storing a video clip from said first video monitoring device.

18. The video monitoring system of claim 17 wherein said video module further includes a trigger input/output port to transmit said stored video clip to said remote video server.

19. The video monitoring system of claim 12 wherein said video module further includes a trigger input/output port to enable video from said first video monitoring device to be forwarded to said remote video server.

20. The video monitoring system of claim 12 wherein said modem is a cable modem.

21. The video monitoring system of claim 12 wherein said modem is a DSL broadband modem.

22. A method of installing a video monitoring system comprising a video module coupled to a video monitoring device and operational through an existing internet-linked computer network wherein said network comprises (i) a modem having a WAN port, (ii) a router having a WAN port and a LAN port, and (iii) a personal computer coupled to said LAN port of said router, said method comprising the steps of:
   (i) installing a video interface module between said modem and said router by coupling said WAN port of said router to a first LAN port of said video interface module and coupling said WAN port of said modem to a WAN port of said video interface module;
   (ii) coupling said video module to a second LAN port of said video interface module;
   (iii) dynamically assigning an identifying address within a predetermined range to said video module;
   (iv) receiving internet protocol device data at said video interface module; and
   (v) determining whether said internet protocol device data should be routed to said video module based on recognition of said identifying address.

23. A method of installing a video monitoring system comprising a video module coupled to a video monitoring device and operational through an existing internet-linked computer network wherein said network comprises (i) a modem having a WAN port and (ii) a personal computer coupled to said modem, said method comprising the steps of:
  (i) installing a video interface module between said modem and said personal computer by coupling said personal computer to a first LAN port of said video interface module and coupling said WAN port of said modem to a WAN port of said video interface module;
  (ii) coupling said video module to a second LAN port of said video interface module;
  (iii) dynamically assigning an identifying address within a predetermined range to said video module;
  (iv) receiving internet protocol device data at said video interface module; and
  (v) determining whether said internet protocol device data should be routed to said video module based on recognition of said identifying address.

24. An alarm monitoring system operational through an existing wide area network (WAN) modem linked to an existing local area network (LAN) system comprising:
  a remote alarm server;
  a first alarm monitoring device;
  an alarm control panel having a first input port coupled to said first alarm monitoring device and an output port for transmitting an alarm output signal, wherein said alarm control panel is dynamically assigned an identifying address within a predetermined range; and
  an alarm interface module having a first LAN port coupled to said LAN system, a second LAN port coupled to said output port of said alarm control panel, a WAN port coupled to said WAN modem, and programming means capable of recognizing said identifying address dynamically assigned to said alarm control panel to route data from said remote alarm server to said alarm control panel while also permitting data communications to said LAN system from said WAN modem that are not initiated from said remote alarm server.

25. The alarm monitoring system of claim 24 further comprising a second alarm monitoring device coupled to a second input port on said alarm control panel.

26. The alarm monitoring system of claim 25 wherein said first alarm monitoring device and said second alarm monitoring device are sensors.

27. The alarm monitoring system of claim 24 wherein said LAN system includes a personal computer.

28. The alarm monitoring system of claim 24 wherein said modem is a cable modem.

29. The alarm monitoring system of claim 24 wherein said modem is a DSL broadband modem.

30. An alarm monitoring system operational through an existing internet-linked computer network wherein said network comprises (i) a modem having a WAN port, (ii) a router having a WAN port and a LAN port, and (iii) a personal computer coupled to said LAN port of said router, said alarm monitoring system comprising:
  a remote alarm server;
  a first alarm monitoring device;
  an alarm control panel having a first input port coupled to said first alarm monitoring device and an output port for transmitting an alarm output signal, wherein said alarm control panel is dynamically assigned an identifying address within a predetermined range; and
  an alarm interface module having a first LAN port coupled to said WAN port of said router, a second LAN port coupled to said output port of said alarm control panel, a WAN port coupled to said WAN port of said modem, and programming means capable of recognizing said identifying address dynamically assigned to said alarm control panel to route data from said remote alarm server to said alarm control panel while also permitting data communications to said personal computer from said modem that are not initiated from said remote alarm server.

31. The alarm monitoring system of claim 30 further comprising a second alarm monitoring device coupled to a second input port on said alarm control panel.

32. The alarm monitoring system of claim 31 wherein said first alarm monitoring device and said second alarm monitoring device are sensors.

33. The alarm monitoring system of claim 30 wherein said modem is a cable modem.

34. The alarm monitoring system of claim 30 wherein said modem is a DSL broadband modem.

35. A method of installing an alarm monitoring system comprising an alarm control panel coupled to an alarm monitoring device and operational through an existing internet-linked computer network wherein said network comprises (i) a modem having a WAN port, (ii) a router having a WAN port and a LAN port, and (iii) a personal computer coupled to said LAN port of said router, said method comprising the steps of:
  (i) installing an alarm interface module between said modem and said router by coupling said WAN port of said router to a first LAN port of said alarm interface module and coupling said WAN port of said modem to a WAN port of said alarm interface module;
  (ii) coupling said alarm control panel to a second LAN port of said alarm interface module;
  (iii) dynamically assigning an identifying address within a predetermined range to said alarm control panel;
  (iv) receiving internet protocol device data at said alarm interface module; and
  (v) determining whether said internet protocol device data should be routed to said alarm control panel based on recognition of said identifying address.

36. A method of installing an alarm monitoring system comprising an alarm control panel coupled to an alarm monitoring device and operational through an existing internet-linked computer network wherein said network comprises (i) a modem having a WAN port and (ii) a personal computer coupled to said modem, said method comprising the steps of:
  (i) installing an alarm interface module between said modem and said personal computer by coupling said personal computer to a first LAN port of said alarm interface module and coupling said WAN port of said modem to a WAN port of said alarm interface module;
  (ii) coupling said alarm control panel to a second LAN port of said alarm interface module;
  (iii) dynamically assigning an identifying address within a predetermined range to said alarm control panel;
  (iv) receiving internet protocol device data at said alarm interface module; and
  (v) determining whether said internet protocol device data should be routed to said alarm control panel based on recognition of said identifying address.

* * * * *